United States Patent [19]
Ageishi

[11] Patent Number: 4,733,447
[45] Date of Patent: Mar. 29, 1988

[54] INK JET HEAD AND METHOD OF PRODUCING SAME

[75] Inventor: Yukihiro Ageishi, Kawasaki, Japan

[73] Assignee: Ricoh Company, Ltd., Tokyo, Japan

[21] Appl. No.: 787,072

[22] Filed: Oct. 15, 1985

[30] Foreign Application Priority Data

Oct. 15, 1984 [JP] Japan .................. 59-215791

[51] Int. Cl.⁴ .................. B21D 53/00; G01D 15/18; B23K 11/00
[52] U.S. Cl. .................. 29/157 C; 346/75; 346/140 R; 219/117.1
[58] Field of Search .................. 346/75, 140 R; 29/157 C; 228/205; 219/117.1; 427/46, 49

[56] References Cited
U.S. PATENT DOCUMENTS

| 3,107,422 | 10/1963 | Eckermann, Jr. | 29/492 |
| 3,758,741 | 9/1973 | Holko et al. | 219/91 |
| 4,389,654 | 6/1983 | Baron et al. | 346/75 |
| 4,460,906 | 7/1984 | Kanayama | 346/140 X |

Primary Examiner—E. A. Goldberg
Assistant Examiner—Gerald E. Preston
Attorney, Agent, or Firm—Oblon, Fisher, Spivak, McClelland & Maier

[57] ABSTRACT

An ink jet head includes a metallic nozzle member and a metallic ink chamber member which are bonded to each other by Joule effect with a thin metallic layer interposed therebetween. The metallic layer is deposited on a mirror-finished surface of the ink chamber member to make contact with a mirror-finished surface of the nozzle member in the event of bonding.

1 Claim, 10 Drawing Figures

INK JET HEAD AND METHOD OF PRODUCING SAME

BACKGROUND OF THE INVENTION

The present invention relates to an ink jet head installed in an ink jet printer and a method of producing the same.

As well known in the art, an ink jet printer includes a head which comprises a body and a flat nozzle member, or nozzle plate, which is formed with a nozzle or nozzles and bonded to the body. The body defines an ink chamber therein which is fluidly communicated to the nozzles of the nozzle plate, so that a jet of ink may be ejected from each of the nozzles. As regards the nozzles, considerable accuracy is required and a great number of methods have heretofore been proposed and tested in both the material and process aspects to attain such precision.

The key to the accuracy and, therefore, reliability is, among others, how the nozzle plate should be bonded to the head body. The predominant implementation proposed for bonding them together is the use of adhesive which is based on organic compounds. Such adhesive, however, fails to maintain the bonding strength over a long time such as six months to several years and, therefore, lacks in reliability. While a diffusion bonding process is another predominant implementation proposed in the past, the problem with this process is that the process temperature is too high to readily preserve an accurate orifice, or nozzle, configuration due to recrystallization, which results in an undesired polygonal shape. Other various implementations are also known in the art such as fusion of glass, mechanical bonding using rubber or the like, pressfitting, Au-Si eutectic bonding, brazing, and welding. These implementations, however, cannot attain the desired precision without resorting to prohibitive costs.

SUMMARY OF THE INVENTION

It is therefore an object of the present invention to provide highly accurate and, therefore, highly reliable nozzle configuration for an ink jet head of an ink jet printer.

It is another object of the present invention to provide an inexpensive nozzle configuration for an ink jet head of an ink jet printer.

It is another object of the present invention to provide a method of producing a nozzle configuration which has the above-described features.

It is another object of the present invention to provide a generally improved ink jet head and a method of producing the same.

In one aspect of the present invention, there is provided an ink jet head comprising a nozzle member formed with at least one orifice for ejecting ink and having a smoothed surface, an ink chamber member defining a cavity which serves as an ink chamber inclusive of an ink passageway, and having a smoothed surface which faces the smoothed surface of the nozzle member, and a thin metallic layer through which the nozzle member and the ink chamber member are bonded to each other. The metal layer is deposited on the smoothed surface of the ink chamber member and made of a metallic material which is easy to form metallic bond with a material which constitutes the smooth surface of the nozzle member.

In another aspect of the present invention, there is provided a method of producing an ink jet head, comprising the steps of forming at least one orifice for ink ejection through a flat nozzle member which includes a smooth surface, smoothing a surface of an ink chamber member, which defines an ink chamber inclusive of an ink passageway, to form a smoothed surface which corresponds to the smooth surface of the flat nozzle member, and bonding the nozzle member and the ink chamber member such that metallic bond is set up between the smoothed surface of the nozzle member and the smoothed surface of the ink chamber member.

In accordance with the present invention, an ink jet head includes a metallic nozzle member and a metallic ink chamber member which are bonded to each other by Joule effect with a thin metallic layer interposed therebetween. The metallic layer is deposited on a mirror-finished surface of the ink chamber member to make contact with a mirror-finished surface of the nozzle member in the event of bonding.

The above and other objects, features and advantages of the present invention will become more apparent from the following detailed description taken with the accompanying drawings.

DESCRIPTION OF THE PREFERRED EMBODIMENTS

While the ink jet head and a method of producing the same of the present invention is susceptible of numerous physical embodiments, depending upon the environment and requirements of use, substantial numbers of the herein shown and described embodiments have been made, tested and used, and all have performed in an emiently satisfactory manner.

Generally, an ink jet head consists of a nozzle or orifice section for providing ink drops, an ink chamber or ink passageway for supplying ink to the nozzle section, and a vibrator for applying mechanical vibration to the ink to form the drops. The function assigned to the vibrator may alternatively be fulfilled by a valve jet or like implementation which does not rely on mechanical vibration.

Characteristic features of the present invention generally reside in the configurations of the nozzles and ink chamber as will be briefly stated.

First, a nozzle member having an orifice or orifices for ejecting ink is provided as a flat and smooth plate. A member which defines an ink chamber inclusive of an ink passageway has its surface smoothed to match with the smooth surface of the nozzle member.

Second, the nozzle member and the ink chamber member are each made of a good conductor such as metal or alloy.

Third, a layer of a material which is easy to form atomic metallic bond with a material which constitutes the surface of the nozzle member is provided on the smooth surface of the ink chamber member.

Fourth, the nozzle member and the ink chamber member are bonded to each other at their smooth surfaces in such a manner as to provide metallic bond.

Fifth, all the above-mentioned members and materials are chemically immune to oxidation when brought into contact with ink.

Figure 1:
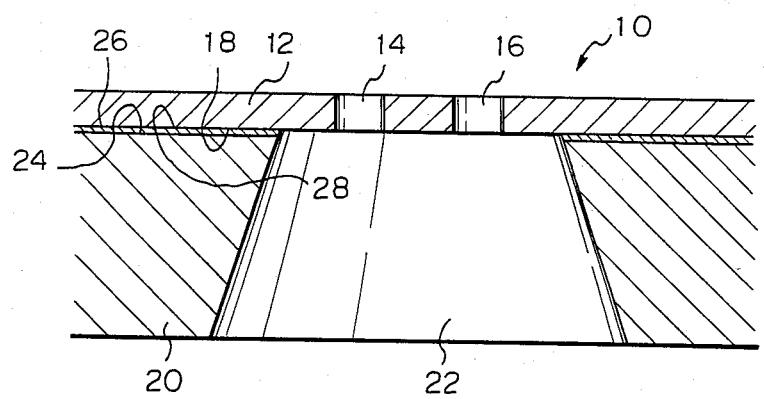
FIG. 1 is a fragmentary schematic section of an ink jet head embodying the present invention.

Referring to FIG. 1, an ink jet head in accordance with the present invention is schematically shown and generally designated by the reference numeral 10. The head 10 includes a nozzle member 12 which is provided with at least one orifice, two orifices 14 and 16 in this particular embodiment, and a smooth surface 18 that serves as a bonding interface between the nozzle member 12 and an ink chamber member 20. The ink chamber member 20 defines an ink chamber 22 which includes an ink passageway and is often called a "cavity". The ink chamber 22 is fluidly communicated to the orifices 14 and 16 so that ink may be communicated from the former to the latter. The ink chamber member 20 includes a smooth surface 24, while a thin layer of a metallic material 26 is intimately deposited on the smooth surface 24. The surface of the metallic layer 26 is designated by the reference numeral 28. The metallic layer 26 is so thin that it essentially has the same flatness as the smooth surface 24 of the ink chamber member 20. The surface 28 of the layer 26 which forms a part of the member 20 is bonded to the smooth surface 18 of the nozzle member 12.

The nozzle member 12 is made of metal, alloy, or their combination. While various nozzles made of metal have heretofore been proposed, any of them is applicable to the present invention insofar as it meets the previously mentioned features particular to the present invention. Although nozzles formed of various other materials such as a single silicon crystal and glass (inclusive of photosensitive glass and other ceramics) are known in the art, they will not be taken into consideration herein.

Now, among ink jet printing systems known in the art, a charge control type system is capable of ejecting a far larger number of ink drops per unit time (more than 100,000 drops per second) than an on-demand type system and, therefore, enhancing high quality printing. At the present stage of the art, although effort is directed toward accomplishing such a merit of the charge control type system by designing orifices with a diameter of 30 microns or less, difficulty has been experienced in providing circular apertures whose diameter is not greater than 30 microns. The present invention allows an orifice to be formed with unprecedented accuracy.

Figure 2:
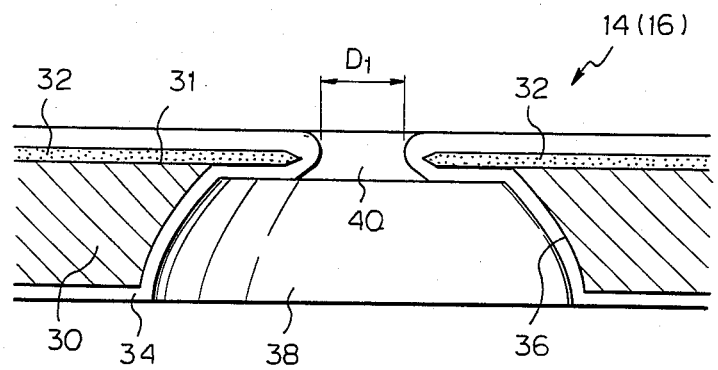
FIG. 2 is an enlarged section of a nozzle member which is included in the head of FIG. 1.

Referring to FIG. 2, the nozzle member 12 of FIG. 1 is shown in a fragmentary enlarged view. Since the orifices 14 and 16 formed through the nozzle member 12 as shown in FIG. 1 are in exactly the same configuration, the following description will be made taking the orifice 14 for example. As shown, the nozzle member 12 comprises a thin substrate 30 which, most desirably, is made of a mill-hardened sheet of beryllium-copper alloy to facilitate treatment and handling. Specifically, the reasons for the selection of such a particular material are, among others, that the alloy mentioned above is easy to mirror-finish and has hardness which is necessary for handling, and because the material of the substrate 30 needs to be different from an orifice forming material so as to be selectively etched at a later stage of chemical milling (photoetching). A nickel layer 32 is deposited on the substrate 30 by plating and adapted to provide an orifice configuration. Another nickel layer 34 is provided by plating over the substrate 30 and nickel layer 32 so as to provide an orifice configuration and to prevent the substrate 30 from corroding due to contact with ink. The substrate 30 is etched to form a generally cup-shaped recess 36, as will be described. The reference numeral 38 designates a generally cup-shaped recess which is provided by photoetching and the second nickel plating, as will also be described. The recess 38 is communicated to an aperture 40 having a diameter $D_1$.

Referring to FIGS. 3-6, a series of steps for producing the nozzle member 12 with the orifice configuration of FIG. 2 are shown. A sheet of precipitation-hardened beryllium-copper alloy is mirror-finished over its opposite surfaces to the order of 0.1 microns Rmax. The alloy sheet is 0.1-0.3 millimeters thick, e.g. 0.2 millimeters thick. The mirror-finishing can readily be implemented by, for example, polishing with alumina powder having a particle size of 1 millimeters or less. The alloy sheet is cut to a predetermined size beforehand to facilitate the polishing work as well as later treatments. The polished alloy sheet serves as the substrate 30 in a later procedure which utilizes photolithography. The substrate 30 is rinsed and, then, photoresist is applied to one of its opposite surfaces. Thereafter, the substrate 30 is prebaked, then exposed by use of a photomask, then developed, then rinsed, and then postbaked. The procedure described so far is not illustrated in the drawings.

Figure 3:
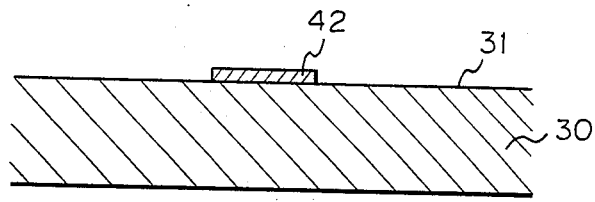
FIGS. 3-6 are fragmentary sections showing a series of steps for producing the nozzle member of FIG. 2.
Figure 4:
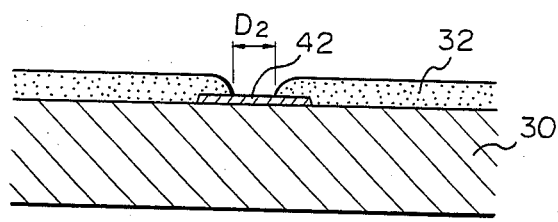

The configuration provided by the above-described procedure is shown in FIG. 3. As shown, a circular photoresist pattern 42 is provided as a projection on the substrate 30. The aperture, or orifice, 40 which will be provided by the pattern 42 should optimumly be as close to a true circle as possible in order to enhance the accuracy of ink ejection direction and, thereby, the quality of printed images. Next, as shown in FIG. 4, that surface of the substrate 30 which is provided with the photoresist pattern 42 is plated with nickel to form the nickel layer 32. The nickel is electrolytic nickel. This, coupled with the fact that the photoresist pattern 42 is nonconductive, provides the characteristic configuration as shown in FIG. 4. The circle on the pattern 42 which is delimited by the nickel layer 32 has a diameter $D_3$ which is smaller than that of the pattern 42 and larger than that $D_1$ of the aperture 40, which will be formed later.

Figure 5:
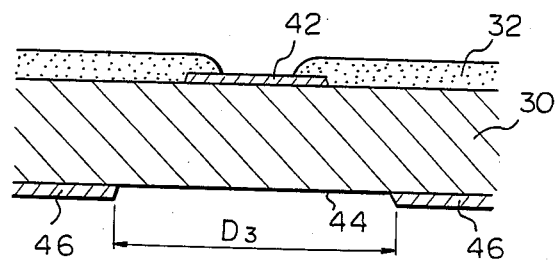
Figure 6:
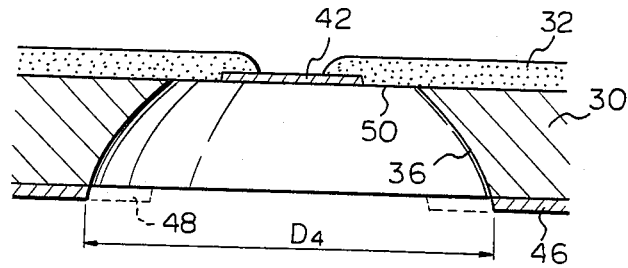

Next, a circular pattern for photoetching is defined on the other surface of the substrate 30. Specifically, the substrate 30 is applied with photoresist, then prebaked, then exposed through a photomask, then developed, then rinsed, and then postbaked to provide a circular photoresist pattern 44 having a suitable diameter, as shown in FIG. 5. Designated by the reference numeral 46 is a material for masking the surface of the substrate 30 such that only the necessary portion of the substrate 30 is etched by an etchant during etching. Ferric chloride is suitable as an etchant for beryllium-copper alloy because its reaction rate is relatively high. Where ferric chloride is used as an etchant, the surfaces of the nickel layer 32 and photoresist pattern 42 on the substrate 30 have to be protected by a film of photoresist or like suitable organic material which can be easily removed later, because ferric chloride is slightly reactive to nickel while significantly attacking beryllium-copper alloy. As a result of the photoetching, the substrate 30 is provided with the cup-shaped recess 36 as shown in FIG. 6. Since the beryllium-copper alloy which constitutes the substrate 30 is isotropically etched during the photoetching process, the cup 36 actually formed has a diameter $D_4$ which is larger than a diameter $D_3$ of the circular photoresist pattern 44. That part of the photoresist layer 46 which is associated with the difference between the diameters $D_3$ and $D_4$ falls off during the etching process, as indicated by the reference numeral 48. As the substrate 30 is so etched, that surface of the nickel layer 32 which is in contact with the substrate 30 partly becomes uncovered as indicated by the reference numeral 50. Although this part 50 of the nickel layer surface reacts with the etchant and is thereby slightly corroded, such does not effect the precision of the diameter $D_1$ because the photoresist 42 is present.

After the configuration shown in FIG. 6 has been provided, the protective film, not shown, and the photoresist layers 42 and 46 are removed and, then, the whole nozzle member 12 is plated again with nickel to complete the configuration shown in FIG. 2. It is to be noted that, where such an orifice is intended for use in an ink jet head, electrolitic plating of pure nickel which is resistive to ink is allowable but not chemical nickel plating (nonelectrolytic nickel plating).

There are some keys to the accomplishment of the configuration shown in FIG. 2 as enumerated below.

First, the center of the photoresist pattern 42 and that of the diameter $D_2$ of the photoresist pattern 46 should be aligned accurately with each other. For experiment, there were prepared photomasks for providing respectively the patterns 42 and 46 each of which was provided with a reference pattern for positioning. When such photomasks were positioned relative to each other using a specially designed jig, their centers were successfully aligned with an error which was less than 20 microns.

Second, the electrolytic nickel plating layer should be formed to a uniform thickness. Extended study proved that the electrolytic nickel plating layer can be provided with an even thickness of submicron order.

Third, the substrate 30 and others should be prevented from being deformed due to stresses which result from plating. Experiments showed that the stresses can be overcome by suitably selecting plating conditions so as to provide a smooth configuration with hardly any deformation.

The nozzle member 12 prepared by the procedure described above is bonded to the liquid chamber member 20 as will be described.

Since the liquid chamber member 20 directly makes contact with ink, it should be made of a material which is resistive to ink such as austenite-based stainless steel, optimumly SUS304, SUS304L, or SUS 303. As well known in the art, austenite-based stainless steel shows remarkable corrosion-resistance because it has a dense passive state film at the surface whose major component is chromium oxides. However, the passive state is undesirable in providing intimate bonding.

Such a dilemmatic situation is settled by the following procedure. First, the surface of the ink chamber member 20 which serves as the surface 24 (FIG. 1) and is to be bonded to the nozzle member 12 is mirror-finished (at least 0.1 microns Rmax). Then, the polished surface is subjected to inverse-sputtering in algon gas atmosphere to destruct and remove the oxide film, followed by depositing the thin metal layer 26 by sputtering to a thickness of at least 500 angstroms. Desirably, the metal which constitutes the layer 26 is nickel.

Figure 7:
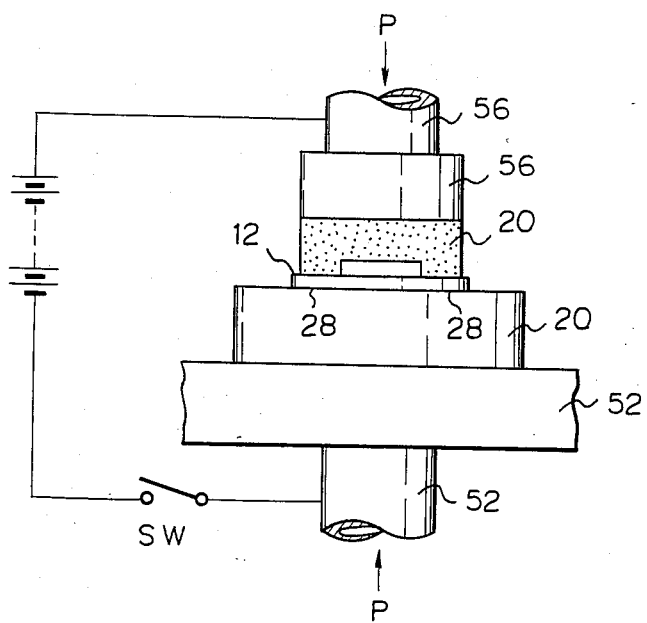
FIG. 7 shows an arrangement for bonding the nozzle member to a member which defines an ink chamber in accordance with the present invention.

As shown in FIG. 7, the ink chamber member 20 prepared by such a procedure is mounted on an electrode 52 which is made of a material having a relatively low resistivity, e.g. copper-chromium alloy or copper-tungsten alloy whose major component is copper. The nozzle member 12 is placed on and accurately positioned relative to the ink chamber member 20. A high resistivity (5.5 microohms per centimeter at 20° C.) is laid on the nozzle member 12. An electrode 56 is placed on the member 54 and, like the electrode 52, formed of a material whose resistivity is low. The stack of these members are pressed as indicated by arrows P such that the members 12 and 20 held between the electrode 52 and the member 54 are pressed against each other and, then, a switch SW is closed to cause current to flow through the stack. As a result, heat is generated by Joule effect mainly in the ink chamber member 20 and the electrode 54, thereby forming the bonding interface 28.

In accordance with the illustrative embodiment, since the surface of the nozzle member 12 is constituted by a nickel layer and that of the ink chamber member 20 by a sputtered nickel layer, they are bonded firmly to each other. Prior art bonding methods include one which relies on heat and pressure (Japanese Unexamined Patent Publication (Kokai) No. 58-167171), and one which relies on diffusion. The problem with such prior art methods is that, since the former uses a heating furnace and the latter involves a high process temperature, the orifice portion is caused to recrystallize due to heating and cooling resulting in poor circularity of the orifice. The bonding method in accordance with the present invention is free from such a problem. In this connection, the combination in accordance with the illustrative embodiment makes the resistivity of nickel highest (6.84 microohms per centimeter at 20° C.), realizing desirable bonding. Conversely, using a traditional spot welder to effect the bonding without using the high resistance member 54 would simply generate heat in the ink chamber member 20 and, thereby, fail to bond it to the nozzle member 12.

It is to be noted that the present invention is practicable with no regard to the number of orifices, or nozzles, which may either be single or multiple.

Concerning the ink chamber member 20, it may alternatively be produced by electroforming technology. In this case, too, the most desirable material is nickel. Electroforming will eliminate the need for the inverse sputtering and Ni-sputtering steps and allow the member 20 to be bonded to the member 12 only if its bonding surface is mirror-finished.

It will be needless to mention that the high resistance member 54 in a plan view has a circular, oval or like contour which is defined by a closed curve in order to prevent ink from leaking through the bonded portions.

Figure 8:
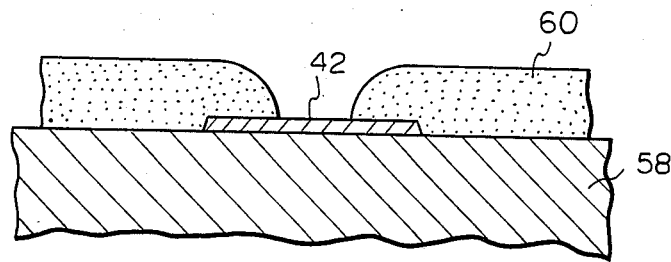
FIG. 8 is a fragmentary section showing an alternative method of producing the nozzle plate.

An alternative method of producing the nozzle member, or nozzle plate, 12 is shown in FIG. 8. This particular method comprises the steps of forming the photoresist pattern 42 on a substrate 58 made of stainless steel SUS 302 or SUS 305L or like material from which nickel is easy to remove, then depositing a nickel plating 60 on the substrate 58, and then removing the nickel plating 60. The nozzle member 12 prepared by this method may be bonded to the ink chamber member 20 by the method which has been discussed in relation to the previous embodiment.

Figure 9:
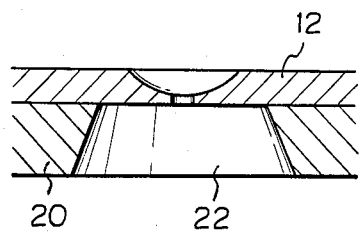
FIGS. 9 and 10 are fragmentary sections showing the nozzle plate in two different positions relative to the ink chamber member.
Figure 10:
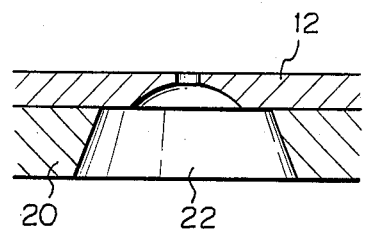

Referring to FIGS. 9 and 10, the nozzle member 12 having the configuration of FIG. 2 is shown in two different positions relative to the ink chamber member 20. While in FIG. 9 the nozzle member 12 is positioned with the aperture 40 directly communicated to the cavity 22 of the ink chamber member 20, in FIG. 10 it is positioned with the aperture 40 communicated to the cavity 22 with the intermediary of the cup-shaped recess 38. Experiments showed that the two different orientations of the nozzle member 12 set up the same ink drop forming range when applied to a continuous charge control ink jet head, which is capable of stably forming ink drops. Nevertheless, the orientation of FIG. 9 was found superior to that of FIG. 10 concerning the removal of bubbles at the start-up of the system. The reason is that since that surface 31 of the substrate 30 where the photoresist pattern 42 is to be provided (see FIGS. 2 and 3) is accurately mirror-finished to ensure accuracy of the pattern 42, it provides the wall of the cavity 22 with smoothness and, compared to the orientation of FIG. 10, with a simpler configuration, thereby enhancing removal of bubbles.

The electrodes 52 and 56 (FIG. 7) which are made of tungsten or the like may have any desired shape so long as it matches with a particular application. The bonding can be accomplished economically with an existing implementation such as a commercially available spot welder which utilizes electrical resistance. While bonding is generally achieved by sequential steps of prepressuring, energizing, pressurizing, deenergizing, and unloading, bonding conditions such as the pressure, voltage and current for the energization and duration of the pressure will naturally be selected depending upon the design conditions of the members 12 and 20.

In relation to the illustrative embodiment, extended study proved that the best result is attainable with beryllium-copper alloy JISC1720P which contains 1.80–2.00 wt.% of Be, more than 0.20 wt.% of Ni+Co, less than 0.60 wt.% of Ni+Co+Fe, and more than 99.5 wt.% of Cu+Be+Ni+Co+Fe.

A sheet prepared by mill-hardening the above material and having a Vickers thickness of Hv 350–390 is excellent in flatness and suitable for use as a material of the substrate 30 of the nozzle member 12. Although such a material contains intermetallic compounds of Co and non-metallic inclusions which are rather undesirable for mirror-finishing, the internal defects have no influence on the accuracy of the orifice diameter because, as shown in FIG. 2, the substrate 30 is not directly related to the orifice portion.

Preferably, the substrate 30 is 0.1–0.3 millimeters thick because such a thickness promotes the ease of handling insofar as the diameter $D_1$ of the orifice or aperture 40 is confined to the range of 15–30 microns. In addition, since the elastic limit of beryllium-copper alloy is so high that the alloy is sparingly deformable against externally derived forces, the nozzle member 12 maintains the accurate orifice diameter as well as its accurate overall configuration despite various kinds of handling which are particular to inspection, transport, bonding, etc.

In the illustrative embodiment, the diameter $D_1$ of the aperture 40 is more accurate than those attainable with other methods known in the art and, especially, when it is smaller than 30 microns, accuracy which is impossible to accomplish with the other methods is achieved. Naturally, the present invention is not limited to orifice diameters smaller than 30 microns and also applicable to relatively large orifice diameters around 50 microns with the same excellent accuracy. That is, one of outstanding advantages of the present invention is that orifices can be formed with considerable accuracy even if their diameter is smaller than 30 microns.

Although the high resistance member 54 shown in FIG. 7 is provided with an annular projection (no numeral) for the purpose of concentrating the pressure force and current, such is not essential when it comes to a single-nozzle head and may be implemented with a simple cylindrical member which is prepared by cutting a rod.

In summary, it will be seen that the present invention provides an ink jet head and a method of producing the same which have various advantages as enumerated below.

(1) The structural elements are relatively inexpensive.

(2) Quantity-basis production is promoted due to the use of photolithography technology.

(3) Economical bonding is accomplished because one bonding cycle is completed within less than several seconds.

(4) Deformation due to bonding is insignificant, insuring accuracy in ejection direction.

(5) Treatment is easy because of the flat configuration.

(6) The nozzle for an ink jet head is accurate and economical.

(7) A bonding strength which is impracticable with adhesion using high molecular materials is insured over a long time.

(8) The orifice portion is free from high temperatures and, therefore, from recrystallization or oxidation, thereby achieving remarkable accuracy.

It should be noted that the present invention is applicable not only to the formation of nozzles of an ink jet head and bonding of a substrate thereof but also to the formation of optical pin holes and apertures and bonding of a microdevice. Where orifices are to serve as pin holes and apertures of an optical circuit, it is preferable to replace the electrolytic nickel shown and described with nonelectrolytic nickel because the latter is easy to form a layer having a uniform thickness.

Various modifications will become possible for those skilled in the art after receiving the teachings of the present disclosure without departing from the scope thereof.

What is claimed is:

1. A method of producing an ink jet head, comprising the steps of:
   (a) forming at least one orifice for ink ejection through a flat nozzle member which includes a smooth surface;
   (b) smoothing a surface of an ink chamber member, which defines an ink chamber inclusive of an ink passageway, to form a smoothed surface which corresponds to said smooth surface of said flat nozzle member; and
   (c) bonding said nozzle member and said ink chamber member such that metallic bond is set up between the smoothed surface of the nozzle member and the smoothed surface of the ink chamber member by generating Joule heat by application of pressure and power, wherein a member having high resistivity is associated with the nozzle member to concentrate the heat generation to the nozzle member side.

* * * * *